United States Patent
Aussems et al.

(10) Patent No.: US 8,287,972 B2
(45) Date of Patent: Oct. 16, 2012

(54) AUTOMOTIVE CABLE HARNESS HAVING CLASS E SEGMENT CABLES AND/OR TUBES

(75) Inventors: Hendricus F. Aussems, Heerlen (NL); Atze J. Nijenhuis, Sittard (NL); Beert J. Keestra, Waaire (NL)

(73) Assignee: DSM IP Assets B.V., Heerlen (NL)

( * ) Notice: Subject to any disclaimer, the term of this patent is extended or adjusted under 35 U.S.C. 154(b) by 197 days.

(21) Appl. No.: 12/743,863

(22) PCT Filed: Nov. 11, 2008

(86) PCT No.: PCT/EP2008/065325
§ 371 (c)(1),
(2), (4) Date: Aug. 16, 2010

(87) PCT Pub. No.: WO2009/065755
PCT Pub. Date: May 28, 2009

(65) Prior Publication Data
US 2011/0003103 A1     Jan. 6, 2011

(51) Int. Cl.
*B29C 47/00* (2006.01)
(52) U.S. Cl. ... 428/36.9; 525/439; 528/272; 174/110 D; 174/110 SR
(58) Field of Classification Search ............... 428/36.9; 525/439; 174/110 D, 110 SR; 528/272, 528/73, 80, 83, 84
See application file for complete search history.

(56) References Cited

U.S. PATENT DOCUMENTS

| 5,914,386 | A | * | 6/1999 | Berendse et al. ............. 528/272 |
| 2010/0249287 | A1 | * | 9/2010 | Schmidt ........................ 524/101 |
| 2011/0003103 | A1 | * | 1/2011 | Aussems et al. ............. 428/36.9 |
| 2011/0045224 | A1 | * | 2/2011 | Heuvel Van Den et al. .......................... 428/36.91 |
| 2011/0177274 | A1 | * | 7/2011 | Lumig Van et al. ........ 428/36.91 |
| 2012/0128977 | A1 | * | 5/2012 | Schmidt et al. ............... 428/375 |

FOREIGN PATENT DOCUMENTS

| EP | 0 102 115 | 3/1984 |
| EP | 0 846 712 | 6/1998 |
| EP | 0 893 463 | 1/1999 |
| WO | 99/51656 | 10/1999 |
| WO | WO 99/51656 | 10/1999 |
| WO | WO 03/014179 | 2/2003 |
| WO | WO 2007/082710 | 7/2007 |

OTHER PUBLICATIONS

International Search Report for PCT/EP2008/065325, mailed Feb. 16, 2009.

* cited by examiner

*Primary Examiner* — N. Edwards
(74) *Attorney, Agent, or Firm* — Nixon & Vanderhye P.C.

(57) ABSTRACT

The invention relates the use of a copolyester elastomer comprising hard blocks comprising polyester segments, polymeric soft blocks and urethane linkages, in applications with a thermal overload requirement specifying a thermal overload temperature above the melting temperature of the copolyester elastomer. The invention also relates to films as well as tubes and electrical cables, such as convoluted tubes and electrical cables for use in cable harness systems. The invention more further relates to polymeric materials with high heat properties that can be used in the tubes and cables and to tubes and cables at least comprising a layer consisting of the polymeric materials.

2 Claims, No Drawings

AUTOMOTIVE CABLE HARNESS HAVING CLASS E SEGMENT CABLES AND/OR TUBES

This application is the U.S. national phase of International Application No. PCT/EP2008/065325 filed 11 Nov. 2008, which designated the U.S. and claims priority to EP Application No. 07022557.8 filed 21 Nov. 2007, the entire contents of each of which are hereby incorporated by reference.

The invention relates to tubes and electrical cables, such as convoluted tubes and electrical cables for use in cable harness systems, as well as films, injection moulded parts, overmouldings and blow moulded products made of thermoplastic elastomers. The invention more particularly relates to polymeric materials with high heat properties that can be use in the tubes and cables and to tubes and cables at least comprising a layer consisting of the polymeric materials. The invention also relates to use of the polymeric materials in applications requiring high heat properties.

Electrical cables typically comprise an electrically conductive core, generally a conductive metal core, and a plastic layer around the conductive core. Often electrical cables comprise two or more conductive cores, each of which covered with a plastic layer as an isolation layer and a cladding or coating layer enveloped around all the conductive cores and isolation layers. Tubes such as convoluted tubes generally are made of a plastic material, sometimes consisting of multiple layers made of different plastic materials.

A cable harness is a string of cables in e.g. car manufacture, which transmit signals (information) or operating currents (energy). The cables are bound together by e.g. clamps, cable ties or sleeves or are bundled and led through a tube such as a convoluted tube. Thus, for instance, modern-day cars contain electrical wires, which would stretch over several kilometres if fully extended.

Cables and tubes used for various electrical applications have to comply with different requirements. For example for confectioning of the cable harness and mounting the cable harness in a car, the cable harness must show sufficient flexibility. This is why the cables and tubes generally comprise or are made of flexible plastic materials. Because of the heat generated by the engine, the plastic materials must be able to withstand high temperatures.

The heat generated by the engine of a car creates a temperature rise under the bonnet of the car. This heat is normally released by cooling fans and other solutions, but nevertheless temperature rise can be substantial. Materials used in these applications are normally selected based on the performance under the continuous use temperature (CUT) applicable for the specific application. However, due to temporarily shortcomings in the cooling and/or heat over production, e.g. due to a hold-up of a car during driving, the temperature might rise significantly and show a peak much higher than the CUT. That is the reason why many norms have an extended requirement for resistance against such a temperature overshoot. In several norms this is translated in a thermal overload requirement of 6 hours at a temperature 50° C. above the CUT.

The plastic materials must also be sufficient impact resistant at low temperature to withstand shocks in winter periods. Several of the requirements are specified in standards or norms, such as ISO6722. This norm is focused on cables but in practice is also applied for convoluted tubing used in electrical applications. This is for example the case in the BMW norm GS 95008-4 that is using the same temperature classes and thermal overload requirements. One of the requirements is temperature resistance with retention of properties, not only at elevated temperatures experienced during continuous use, but also in thermal overload situations. ISO6722 specifies different requirements for different classes of materials depending on the intended use and the continuous use temperature and thermal overload that can occur in those applications. For example, for the class D segment the products have to withstand 3000 hours at 150° C., 240 hours at 175° C. and 6 hours at 200° C., while for the class E segment the products have to withstand 3000 hours at 175° C., 240 hours at 200° C. and 6 hours at 225° C.

The number of materials that can comply with the latter requirements of the class E segment and meanwhile are flexible and impact resistant enough at low temperatures are limited. Typically for these applications, costly materials as ethylene-tetrafluorethylene copolymer (ETFE) and other fluoroelastomers and perfluoroelastomers are used. Many polymers such as polyamides like PA11 and 12 and polyether ester elastomers are flexible but fail in the thermal overload test. Polymers such as polyamides like PA66 and polyesters like PET can comply with the thermal overload test but lack sufficient flexibility.

The number of materials that can comply with the thermal requirements of the class D segment is larger, resulting in the requirements for flexibility and impact resistance to be raised.

Therefore, there is a need for more plastic materials that are flexible and sufficient thermal resistant to withstand thermal overload that can be used in tubes and cables for electrical applications in the class E segment as well as plastic materials for other segments that have improved properties.

The aim of the present invention is to provide a plastic material as well as tubes and cables comprising the flexible plastic material that can comply with thermal overload requirements of the class E segment.

This aim has been achieved with the tubes and cables according to the invention comprising at least a layer consisting of a polymer composition (X) comprising
(A) a copolyester elastomer and optionally
(B) a semicrystalline polyester,
wherein
the thermoplastic copolyester elastomer comprises hard blocks comprising polyester segments, polymeric soft blocks and urethane linkages,
the thermoplastic polymer composition (X) has a melting temperature (Tm-X) of more than 200° C.

It is noted that polymer composition (X) comprises the copolyester elastomer (A), and optionally further comprises the semicrystalline polyester (B) and/or other components. The copolyester elastomer (A) likewise has a melting temperature, denoted herein as Tm-I, whereas the semicrystalline polyester (B), has a melting temperature, denoted herein as Tm-B. In absence of the semicrystalline polyester (B) and/or other components the polymer composition (X) consists of the copolyester elastomer (A), and Tm-X will be equal to Tm-A. In case both a copolyester elastomer (A) having a melting temperature Tm-A and a semicrystalline polyester (B) having a melting temperature Tm-B are present, and the polymer composition (X) exhibits two melting temperatures representative respectively for the copolyester elastomer (A) and the semicrystalline polyester (B), for Tm-X the highest of the two melting temperatures has to be taken.

In an embodiment related to the use of polymer composition (X) of the present invention, there is provided a use of a polymer composition (X) having a melting temperature (Tm-X), and comprising or consisting of a copolyester elastomer (A), the copolyester elastomer (A) having a melting temperature (Tm-A) and comprising (a) hard blocks comprising polyester segments, (b) polymeric soft blocks, and (c) urethane linkages, for making products with a thermal overload requirement specifying a thermal overload temperature (Tto), wherein Tto is above Tm-A and/or Tm-X, wherein Tm-A and/or Tm-X is more than 200° C. as measured by differential scanning calorimetry (DSC) (2nd run, 10° C./min.) according to ASTM D3418-97.

Products with a thermal overload requirement specifying a thermal overload temperature (Tto) include class E segments which are required to withstand temperatures of 225° C. for 6 hours in accordance with ISO6722. Thus, products manufactured to comply with such industry specifications, or the like, which specify a high temperature performance above 200° C. fall within the scope of the present invention.

In another embodiment related to the use of polymer composition (X) of the present invention, there is provided a use of a polymer composition (X) having a melting temperature (Tm-X), and comprising or consisting of a copolyester elastomer (A), the copolyester elastomer having a melting temperature (Tm-A) comprising (a) hard blocks comprising polyester segments, (b) polymeric soft blocks, and (c) urethane linkages, for the manufacture of products wherein the composition (X), during manufacture or future use thereof, is heated above Tm-A and/or Tm-X for a sufficient time to initiate cross linking of the composition and thereby convert the composition to a thermoset composition. This enables the composition to maintain its functional integrity above Tm-A and/or Tm-X, wherein Tm-A and/or Tm-X is more than 200° C. as measured by differential scanning calorimetry (DSC) (2nd run, 10° C./min.) according to ASTM D3418-97.

This phenomena is surprising given that the starting polymer composition is able to be compounded and processed above the melting point of Tm-A and/or Tm-X and yet behaves as a thermoplastic polymer. However, upon a more prolonged exposure to high temperature (i.e. more than 200° C.) the composition takes on the characteristics of a thermosetting composition. These previously unknown properties which are inherent in polymer composition (X) enable such composition to be successfully used in new applications which require the composition to maintain its mechanical integrity above Tm-A and/or Tm-X for a sustained period of time to thereby satisfy its functional requirements, such as that of class E segment qualification according to ISO6722 or GS 95008-4. Indeed, the newly found properties of composition (X) enable it to be advantageous used in high temperature applications which have a thermal overload temperature (Tto) at or above Tm-A and/or Tm-X. The high temperature performance of using composition (X) far exceeds the increase in high temperature performance by the use of a composition with a higher melting point, but still below Tto.

A thermoplastic polymer composition for the purposes of the present invention means a polymer composition which is or has the ability to be repeatably heat processed, such that the material is considered to be recyclable in the same or other applications. Thus, the mechanical properties of a thermoplastic plastic composition which has been processed once or several times into the insulating covering of a wire or the like are comparable with the properties of the starting material.

A thermosetting composition for the purposes of the present invention means a polymer composition which is or has the ability to be crosslinked to the extent that is no longer heat processable, such that the material is not considered recyclable. Typically this is achieved through electron beam crosslinking method or a chemical crosslinking method.

The use of polymer composition (X) extends to the use of products which comprise polymer composition (X).

Functional integrity, as describes herein, means that the composition is able to function as required according to the prescribed performance criteria applicable in its intended use. For instance, class E segments have to withstand temperatures of 225° C. for 6 hours in accordance with ISO6722.

It has surprisingly been found that copolyester elastomers comprising hard blocks comprising polyester segments, polymeric soft blocks, and urethane linkages, (denoted herein for briefness also as TPE-EUS) can withstand peak temperatures above the melting temperature (Tm-A) of the TPE-EUS with substantial retention of the properties, such that TPE-EUS can be used in applications with peak temperatures, occurring during the thermal overload conditions, above Tm and maintained for a significant time.

Such an effect is not obtained with, for example, polyether ester elastomers, comprising polyether soft blocks and polyester hard blocks, and copolyester ester elastomers comprising polyester soft blocks and polyester hard blocks, but not comprising urethane linkages.

As a result thereof, the tube and/or cable, comprising a layer consisting of the said polymer composition (X), can better withstand the thermal overload test as, for example, the said copolyether ester elastomers and copolyester ester elastomers having comparable melting temperatures.

The thermal performance of the TPE-EUS can be further enhanced by combining the TPE-EUS, in a polymer composition, with one or more other polymers having a higher melting temperature than Tm-A, thereby raising the melting temperature of the polymer composition, or by adding inorganic fillers and/or reinforcing agents.

If the TPE-EUS is used as such it can withstand the thermal overload for, for example of 6 hours at a thermal overload temperature (Tto) which is between 0 and 25° C. above Tm-A, while for a polymer composition (X) wherein the TPE-EUS is combined with another polymer, such as a semi-crystalline polyester, having a melting temperature (Tm-B) above that of the TPE-EUS, such that the polymer composition has a melting temperature (Tm-X) above Tm-A, the Tto can be even higher. For a 6 hour thermal overload, Tm-X is preferably less than 25° C. below Tto, while eventually Tm-X might be even equal or higher than Tto. Tm-X might be equal or higher than Tto, for example if the polymer composition (X) comprises next to the copolyester elastomer (A), a semi-crystalline polyester (B).

Preferably, the difference between Tto and Tm-A, and/or between Tto and Tm-X, is between 0 and 25° C. The advantage of this difference, with Tm-A and/or Tm-X being less than 25° C. below Tto, is that the polymer composition (X) can be processed into moulded products at relatively low processing temperatures, while the resulting moulded products have a good performance at thermal overload conditions, wherein either the processing temperatures and/or the thermal overload performance is improved compared to other copolyester elastomers compositions not comprising the urethane groups as according to the present invention.

In a preferred embodiment of the present invention the TPE-EUS, either as such or comprised by a polymer composition has a melting temperature Tm-A of more than 200° C.

In another preferred embodiment the polymer composition comprises a TPE-EUS and a semi-crystalline polyester, wherein the polymer composition has a melting temperature Tm-A, or where applicable Tm-X, of more than 200° C. Suitably the TPE-EUS used herein has Tm-A below 200° C. and the semi-crystalline polyester has a Tm-X above 200° C.

The advantage of the TPE-EUS having a Tm-A of more than 200° C. or the polymer composition comprising the -EUS and the semi-crystalline polyester having a Tm-X of more than 200° C. is that tubes and cables made thereof comply with the thermal overload of 6 hours at 225° C., as according to class E requirements of ISO6722, for cables, or GS 95008-4, for tubes respectively.

Preferably, Tm-A and/or Tm-X is below Tto, in case of tubes and cables for applications with ISO6722-class E requirements, below 225° C. This has the advantage that the cables and hoses still comply with the thermal overload requirements, while the TPE-EUS and the polymer composition comprising the TPE-EUS have a lower hardness and are more flexible.

Surprisingly, the melting temperature (Tm-X) of the thermoplastic polymer composition does not need to be 225° C. or higher, even with a lower melting temperature (Tm-X) of the thermoplastic polymer composition the tubing system can fulfill the thermal overload test of 6 hours at 225° C.

For achieving the required melting temperature more than 200° C., either a TPE-EUS with a melting temperature of more than 200° C. is used, which can optionally combined with another polymer such as the semi-crystalline polymer, or a TPE-EUS with a melting temperature of at most 200° C. is used in combination with a semicrystalline polyester with a melting temperature above 200° C.

Preferably the TPE-EUS and/or the type and amount of semicrystalline polyester is chosen such that the melting temperature of the TPE-EUS, or the polymer composition, is in the range of 205-225° C., more preferably 210-220° C.

It is noted here that the values for the melting temperatures for the copolyester elastomer and the polymer composition mentioned hereabove and below and throughout this invention refers to melting temperatures measured by differential scanning calorimetry (DSC) (2nd run, 10° C./min.). The melting temperature is measured according to ASTM D3418-97, under nitrogen, using the following temperature profile: heating from room temperature to 250° C. with a rate of 10° C./min; holding the material at 250° C. for 2 minutes; cooling the material to 70° C. with a rate of 10° C./min; holding the material at 70° C. for 2 minutes; and heating the material to 250° C. with a rate of 10° C./min. The melting temperature is determined for the second heating as the temperature falling in the melting range and showing the highest melting rate.

The advantage of a higher melting temperature for the TPE-EUS, respectively the polymer composition, is that the tube, respectively the cable, wherein the TPE-EUS, respectively the polymer composition is used, has a better property retention at elevated temperature, whereas a lower melting temperature the tube or cable has a higher flexibility and easier processing.

The present invention also relates to films. The TPE-EUS, respectively the polymer composition, can not only be used in tubes and cables, but also in films. Such films also have the advantages of increased thermal stability at high temperature, in particular above one or more of the respective melting points, and retention of flexibility at low temperature, as described above.

The same advantage applies to overmouldings, injection moulded parts and blow moulded parts, made of thermoplastic elastomer compositions according to the present invention, for example in overmoulded connectors, inboard boots such as CVJ boots, fuel tubes, and air inlet manifolds.

The cable as mentioned herein, or used in applications according to the invention, more specifically is an electrical cable. An electrical cable typically comprises an electrically conductive core (A) and one or more plastic layers covering the conductive core. The plastic layer or layers may comprise, for example, an external cladding or coating layer (B), and optionally an isolation layer (C). The electrical cable may also comprise 2 or more conductive cores (A), each of which optionally covered with one or more isolation layers (C) and all conductive cores (A), and the optional isolation layers (C) covered with and/or enveloped by an external cladding or coating layer (B).

Each of the individual layers may consist, either separately or all together, may consist of the TPE-EUS or the polymer composition (X) comprising the TPE-EUS, or any preferred embodiment thereof described herein.

The temperature resistance of the electrical cable and retention of the properties thereof can be tested, for example, as follows: after the thermal treatment the cable is, for example, wound round a mandrel and visually inspected on occurrence of cracks, and/or immersed in water and tested on short-circuitry. Suitably, the cable is tested according to ISO 6722.

The tube according to the invention, or used in applications according to the invention, may in principle be any tube, such as a single layered tube or multilayered tube and/or a smooth or corrugated tube. The tube suitably is a single layer tube consisting of, or is a multilayer tube at least comprises a layer, comprising a TPE-EUS, or made of a plastic composition comprising a TPE-EUS, or any preferred embodiment thereof described herein.

The temperature resistance of the tube and retention of the properties thereof can be tested, for example, as follows: after the thermal treatment the tube is, for example, visually inspected on retention of its shape and/or mechanically tested on flexibility and impact strength. If it fails it may have collapsed or have become to brittle. Suitably, the tube is tested according to the BMW norm GS-95008-4

The cables and tubes according to the invention are particularly suited for use in a cable harness for car manufacture, having the advantages described above. The invention therefore also relates to a cable harness for car manufacture, and use of the cable harness in a car, comprising a cable and/or tube according to the invention or any preferred embodiment thereof.

The film according to the invention, or the film used in applications according to the invention, may in principle be any film, such as a single layered film or multilayered film. The film suitably is a single layer film consisting of, or is a multilayer film at least comprising a layer comprising a TPE-EUS, or made of a plastic composition comprising a TPE-EUS, or any preferred embodiment thereof described herein.

The temperature resistance of the film and retention of the properties thereof can be tested, for example, as follows: after the thermal treatment the film is, for example, visually inspected on retention of its shape and/or mechanically tested on flexibility. If it fails it may have crumbled or have become too low in elongation at break.

It has not only been found that the moulded products according to the invention can withstand thermal overloads at temperatures being above the melting temperature Tm-A of the copolyester elastomer (A) comprising urethane linkages, or the melting temperature Tm-X of the polymer composition (X) comprising said copolyester elastomer (A), but surprisingly it has also been found that the performance of the said products at continuous use temperatures below the said melting temperatures can be enhanced by treating the moulded products for a short period at a temperature above the said temperatures.

For that purpose the moulded products are preferably subjected to a temperature (Ty) between 0 and 25° C. above Tm-A and/or Tm-X for a period of between 10 minutes and 30 hours, more preferably between 30 minutes and 5 hours. Also preferably, this heat treatment is applied in an oxygen poor environment, preferably a gas environment with less than 5 mole %, more preferably less than 1 mole % oxygen, Still more preferably the heat treatment is applied in an inert environment, such as in nitrogen gas.

The invention also relates to a copolyester elastomer. The copolyester elastomer according to the invention comprises (a) hard blocks comprising polyester segments, (b) polymeric soft blocks, and (c) urethane linkages, wherein the polymeric soft blocks comprise polycarbonate soft blocks (denoted as copolycarbonate urethane ester elastomers), and the copolymer elastomer has a melting temperature between 200 and 225° C.

Suitably, the copolycarbonate-urethane-ester elastomer is made of hard polyester segments made up of repeating units derived from an aromatic dicarboxylic acid, optionally combined with e.g. a cycloaliphatic dicarboxylic acid and an aliphatic diol, and of soft segments made up of repeating units of an aliphatic carbonate, and/or soft segments made up of randomly distributed repeating units of an aliphatic carbonate and either an aliphatic diol and an aliphatic dicarboxylic acid or a lactone, or a combination thereof. The polycarbonate soft blocks preferably comprise repeating units derived from hexamethylene carbonate.

Copolyester elastomers with polycarbonate soft blocks and urethane linkages are known, for example, from EP-0846712-B1. The melting temperature of the known copolycarbonate ester elastomers from this patent application lies in the range of 181-199. EP-0846712-B1 does neither mention nor suggest to use the copolycarbonate ester elastomers for applications with thermal overload temperatures above Tm, let alone to use such materials in class E segment applications.

For the preparation of the copolycarbonate urethane ester elastomers according to the invention, starting materials for the polycarbonate soft blocks, the polyester hard blocks and the urethane linkages, as mentioned in EP-0846712-B1, as well as methods described in EP-0846712-B1 may be used. For obtaining the higher melting points, the ratio of polyester hard blocks versus polycarbonate soft blocks can be increased, or using longer polyester hard blocks in combination with longer polycarbonate soft blocks.

The urethane linkages in the TPE-EUS or copolyester elastomer (A) can be linkages between hard blocks and polymeric soft blocks. The urethane linkages can likewise also be part of the hard blocks and/or of the polymeric soft blocks, thus forming linkages between segments within the hard blocks and/or within the polymeric soft blocks.

The invention also relates to a polymer composition (X) comprising
(A) a copolyester elastomer comprising hard blocks comprising polyester segments, polymeric soft blocks, and urethane linkages, (denoted as TPE-EUS), and
(B) a semicrystalline polyester,
wherein
the thermoplastic copolyester elastomer (A) has a melting temperature (Tm-A) of more than 200° C., and/or
the polymer composition (X) has a melting temperature (Tm-X) of more than 200° C.

In a preferred embodiment of the polymer composition, Tm-A and/or Tm-X is between 200 and 225° C., preferably in the range of 205-220° C., still more preferably 210-215° C.

In another preferred embodiment of the polymer composition (X) the copolyester elastomer (A) has a melting temperature (Tm-A) of less than 200° C., more preferably more than 160° C. or 180° C., and the semicrystalline polyester (B) has a melting temperature of more than 200° C., preferably in the range of 210-250° C., or even 220-240° C. This embodiment allows for even better optimizing low temperature flexibility and high temperature property retention.

The polyester hard blocks can be made of repeat ester units based on or derived from short chain diols and aromatic dicarboxylic acids.

The aromatic dicarboxylic acid in the hard segments of the TPE-EUS can be, for example, terephthalic acid, naphthalene dicarboxylic acid and biphenyl dicarboxylic acid, or a mixture thereof. Optionally the dicarboxylic acids comprises, small amounts of dicarboxylic acid other than aromatic dicarboxylic acid, for example cyclohexanedicarboxylic acid. The aliphatic diol can be, for example, ethylene diol (also known as ethylene glycol), propylene diol, butylene diol (also known as 1,4-butane diol), hexamethylene diol, or a mixture thereof. The hard segments are preferably made up of repeating units derived from an aromatic dicarboxylic acid comprising terephthalic acid and an aliphatic diol comprising ethylene glycol and/or 1,4-butane diol, in other words the polyester hard blocks comprise PBT and/or PET segments. More preferably, the hard segments are made of terephthalic acid and 1,4-butane diol (PBT).

The soft blocks in the TPE-EUS used in the present invention may be chosen from polymers varying widely in composition and preferably can be build in by urethane linkages. The soft blocks may comprise, for example, polyether, polyester and/or polycarbonate segments. Suitably, the soft blocks comprise polyether soft blocks, polyester soft blocks, and/or polycarbonate soft blocks. The TPE-EUS with polyether soft blocks will also be denoted herein as copolyether-urethane-ester elastomer. The TPE-EUS with polyester soft blocks will also be denoted herein as copolyester-urethane-ester elastomer, and the TPE-EUS with polycarbonate soft blocks, are denoted herein, as mentioned above, as copolycarbonate-urethane-ester elastomer.

With a copolyether-urethane-ester elastomer is herein understood a block copolymer containing hard segments consisting of blocks of a high-melting crystalline or semi-crystalline, aromatic or semi-aromatic polyester and soft segments consisting of blocks of a low-melting polyether, and wherein the hard segments and the soft segments can be connected with urethane groups. Suitably, part of the hard segments and the soft segments are connected with a urethane group, and favourably all hard segments and the soft segments are connected with a urethane group. Also suitably, the copolyether-urethane-ester elastomer is made of hard polyester segments made up of repeating units derived from an aromatic dicarboxylic acid and an aliphatic diol, and of soft segments made up of polyglycolethers, also known as poly(alkylene oxides). Examples of poly(alkylene oxides) that are suitable soft segments in the copolyether ester elastomer are poly(ethylene oxide), poly(propylene oxide) and poly(tetramethylene oxide), and random copolymers and block-copolymers of the structural repeat units derived from monomeric units like ethylene oxide, propylene oxide and/or tetramethylene oxide. Copolyether-urethane-ester elastomers as well as the preparation thereof, are described, for example, in the PCT patent application WO99/51656.

With a copolyester-urethane-ester elastomer is herein understood a block copolymer containing hard segments consisting of blocks of a high-melting crystalline or semi-crystalline aromatic or semi-aromatic polyester and soft segments consisting of blocks of a low-melting polyester diol, and wherein the hard segments and the soft segments can be connected with a urethane group. Suitably, part of the hard segments and the soft segments are connected with a urethane group, and favourably all hard segments and the soft segments are connected with a urethane group. Also suitably, the copolyester-urethane-ester elastomer is made of hard polyester segments made up of repeating units derived from an aromatic dicarboxylic acid and an aliphatic diol, and of soft segments made up of either an aliphatic diol and an aliphatic dicarboxylic acid or a lactone, or a combination thereof. Herein either the aliphatic diol may comprise an cycloaliphatic diol and/or the aliphatic dicarboxylic acid may comprise an cycloaliphatic dicarboxylic acid. Copolyester-urethane-ester elastomers as well as the preparation thereof, are described, for example, in European patent EP-0102115-B1.

Polyether soft blocks provide better hydrolysis resistance, polyester soft blocks and even more so polycarbonate segments provide better thermal overload property retention.

Suitable isocyanates for use as building blocks for making the urethane linkages are the usual difunctional isocyanates, or diisocyantes, represented by the formula OCN—R—NCO.

Urethane linkages, as present in the TPE-EUS in the invention described herein, can have been formed by reaction of the diisocyanates with for example long chain diols and short chain diols. Urethane groups are chemically represented by the following formula: —O—C(O)—NH—. The resulting urethane linkages can then be represented by repeat units having a structure —O—C(O)N(H)—R—N(H)C(O)—O—.

In both formulas OCN—R—NCO and —O—C(O)N(H)—R—N(H)C(O)—O—, R can represent an aliphatic bi-iradical moiety, an aliphatic-aromatic diradical moiety, or an aromatic bi-radical moiety.

The aliphatic diradical moiety can be either linear, branched or cyclic, or a combination thereof, such as cycloaliphatic biradical, and preferably contains 2-15 carbon atoms.

Diisocyanates that can be used in the TPE-ESU and from which the urethane linkages may be derived are, for example, aromatic diisocyanates such as toluenediisocyanate (TDI) (R=—C$_6$H$_3$(—CH$_3$)—), phenyl diisocyanate (—C$_6$H$_4$—) and methylenediphenyldiisocyanate or difenylmethane-diisocyanate (MDI) (R=(—C$_6$H$_4$—CH$_2$—C$_6$H$_4$—), aliphatic-aromatic diisocyantes such as tetramethylxylilene diisocyante (TMXDI) (R=—(CH$_3$)$_2$C—C$_6$H$_4$—CH(CH$_3$)$_2$—), and aliphatic diisocyanates such hexane diisocyanate or hexamethylene-diisocyanate (HMDI) (R=—(CH$_2$)$_6$—), cyclohexane diisocyanate) CHDI' (R=—C$_6$H$_{10}$—) or isophorone/diisocyanate (IPDI) (R=—C$_6$H$_7$—(CH$_3$)$_3$—). Preferably, the diisocyanate is an aromatic diisocyanate, more preferably methylenediphenyldiisocyanate (MDI). The advantage of MDI is an even better contribution to the thermal stability of the products in thermal overload conditions.

The isocyanates used for the the preparation of the copolyester elastomer with urethane linkages can be pure diisocyanates, or may comprise small amounts of other components, as are regularly present in commercial diisocyanate products, such as carbodimides, uretonimines, isocyanurates, and urethdion and/or allophanate residues, as well as small amounts of triisocyanates. For the preparation of the copolyester elastomer with urethane linkages, next to the soft block segments and hard block segments, or precursors thereof, the diisocyanates can also be used in combination with chain extenders like short chain diols and/or short chain diamines.

The urethane linkages may be present in the polymer composition, or the products made thereof, according to the invention, in an amount varying over a wide range. For calculating the amount of urethane linkages one could use the structure of the repeat units —O—C(O)—NH—R—NH—C(O)—O—. Rather, for practical reasons it is preferred to use the formula for the diisocyanates from which the repeat units have been derived. The amounts thus calculated formally exclude the O and H atoms originating from the —OH end groups of the long chain and short chain diols. By doing so the urethane linkages can be represented by the formula —O—C—N—R—N—C—O—.

Preferably, the urethane linkages, represented by the formula —O—C—N—R—N—C—O—, are present in an amount of 0.5-15 wt. %, preferably 1-10 wt. %, more preferably 2-6 wt. %, relative to the total weight of the copolyester elastomer (A) and the optional semicrystalline polyester (B).

Surprisingly, already at very low amounts an effect on the property retention is observed and this effect increases with increasing amount. At higher amounts the increase levels of. A lower maximum amount has the advantage of combining a better balance in very good thermal stability at thermal overload conditions and flexibility of the polymer composition.

The polymer composition (X) or the copolyester elastomer (A) used therein may have a hardness or flexibility varying over a large range, although preferably having a Shore D hardness of less than 80, and more preferably in the range of 60-75. A lower hardness results in a higher flexibility whereas a higher hardness results in a better thermal overload performance.

The semicrystalline polyester (B) in the polymer composition used in the present invention may be any semicrystalline polyester that is suitable for use in cable, tube or film applications and by which for example the mechanical properties of the TPE-EUS may be balanced and/or the melting temperature is raised. Preferably, PBT and/or PET, is used. More preferably PBT is used as the semi-crystalline polyester in combination with a copolyester elastomer comprising PBT hard segments.

The semicrystalline polyester (B) may be present in the polymer composition according to the invention, or the products made thereof, in a vary wide range. Preferably the semicrystalline polyester (B) is present in an amount of 1-40 wt. %, more preferably 5-35 wt. %, or even more preferably 10-30 wt. %, relative to the total weight of copolyester elastomer (A) and the semicrystalline polyester (B).

The polymer composition, and the products made thereof according to the invention, may comprise, next to the copolyester elastomer (A) and the optional semicrystalline polyester (B), one or more additional polymer component and/or additives.

Additives that may be present in the polymer composition and the products made thereof include the auxiliary usual additives, known by the person skilled in the art of making flexible copolyester elastomers and the use thereof. Suitable additives are, for example, stabilisers, such as UV stabilizers, heat stabilizers and antioxidants, pigments and colorants, processing aids, for example mould release agents and lubricants, flow improving additives, agents for improving the impact resistance, fillers and flame retardants, such as halogen containing flame retardants, halogen free flame retardants and flame retardant synergists.

Polymers that may be comprised by the polymer composition include, for example, copolyester elastomers, other than the TPE-EUS, i.e. copolyester elastomers not comprising urethane linkages.

In case the said polymer composition comprises an additional polymer component, the copolyester elastomer (A) and the optional semicrystalline polyester (B) are preferably present in a combined amount of at least 50 wt. %, more preferably at least 75, and still more preferably at least 90 wt. % or even 95 wt. %, relative to the total amount of polymer components in the polymer composition.

In case the polymer composition comprises one or more additives, the additives are preferably present in an amount of at most 40 wt. %, more preferably at most 25 wt. %.

The semicrystaline polyester making part of the polymer composition according to the invention described hereabove, is an optional component for polymer composition of which the products such as the films, tubes and cables according to the invention are made, or at least comprised a layer therein. It is noted that everywhere here above preferred features, embodiments, ranges or compositions are mentioned for other elements than the semicrystaline polyester are described, these preferred features, embodiments, ranges or compositions are applicable for the polymer composition according to the invention, as well as for the products such as the films, tubes and cables, made of the polyester elastomer or polymer composition, both for the situation where the semicrystalline polyester is present as well as where the semicrystalline polyester is absent.

The invention is further illustrated with the following Examples and Comparative Experiments.

Materials

I-P Copolyether ester, Tm 210° C., no urethane linkages.
II-UC Copolycarbonate ester with urethane linkages, Tm 199° C., 5 wt. % urethane linkages.
III-UE Copolycarbonate ester with urethane linkages, Tm 220° C., 5 wt. % urethane linkages.
PBT Tm 225° C.

Weight percentage of urethane linkages is based on the amount of diisocyanate relative to the total weight of the copolyester elastomer, respectively the total amount of copolyester elastomer and PBT in the polymer composition.

Melting Temperature

The melting temperature was measured by differential scanning calorimetry (DSC) (2nd run, 10° C./min.) according to ASTM D3418-97, under nitrogen, using the following temperature profile: heating from room temperature to 250° C. with a rate of 10° C./min; holding the material at 250° C. for 2 minutes; cooling the material to 70° C. with a heating rate of 10° C./min; holding the material at 70° C. for 2 minutes; and heating the material to 250° C. with a heating rate of 10° C./min. The melting temperature is determined for the second heating run as the temperature falling in the melting range and showing the highest melting rate. For the measurement an amount of 5 mg polymeric material was used.

The temperature applied during the thermal overload test can be measured with standard methods and thermometers.

Processing and Testing

The products have been used as such, or dry-blended prior to processing, where applicable.

The products, or blends, were extruded on standard extrusion equipment for making tubes and cables. The resulting products were subjected to a thermal overload test at a temperature of 225° C. for 6 hours in ambient atmosphere and pressure. The tubes were inspected on retention of shape and flexibility (winding test see GS 95008-4). The cables were inspected on flexibility by winding on a mandrell and in an electrical leakage test. The tests were performed according to ISO6722. The compositions and test results are shown in Table 1.

TABLE 1

Compositions and test results for Examples I and II (EX-I and II) and Comparative Experiments A-C (CE-A, B and C)

|  | CE-A | CE-B | Ex-I | Ex-II |
|---|---|---|---|---|
| I-P | 100 |  |  |  |
| II-UC |  | 100 | 80 |  |
| III-UE |  |  |  | 100 |
| PBT |  |  | 20 |  |
| Tm (° C.) | 210 | 199 | 214 | 220 |
| Urethane linkages (wt. %) | 0 | 5 | 4 | 5 |
| Tubes | Fail | Fail | Pass | Pass |

The test results illustrate that products with either a too low melting temperature and/or absence of urethane linkages (CE-A and CE-B) fail in the test. In contrast, the products of Ex-I and Ex-II, despite the fact that these have a melting temperature below the temperature at which the thermal overload test is done, show a satisfactory result. The products of Ex-I and II comply with the requirement of the present invention that these products comprise urethane linkages.

The invention claimed is:

1. An automotive cable harness having convoluted tubes and/or electrical cables comprising at least a layer consisting of a polymer composition (X) comprising:

(A) a copolyester elastomer; and optionally (B) a semi-crystalline polyester; wherein the copolyester elastomer comprises hard blocks comprising polyester segments, polycarbonate soft blocks and urethane linkages, the copolyester elastomer, the composition having a melting point (TM-X) of between 200 and 225° C., as measured by differential scanning calorimetry (DSC) ($2^{nd}$ run, 10° C./min) according to ASTM D3418-97.

2. The automotive cable harness according to claim 1, wherein the copolyester elastomer is made of hard polyester segments made up of repeating units derived from an aromatic dicarboxylic acid, optionally combined with a cycloaliphatic dicarboxylic acid and an aliphatic diol, and of soft segments made up of repeating units of an aliphatic carbonate, and/or soft segments made up of randomly distributed repeating units of an aliphatic carbonate and either an aliphatic diol and an aliphatic dicarboxylic acid or a lactone, or a combination thereof.

* * * * *